(12) United States Patent
Mazzocchi

(10) Patent No.: US 8,944,460 B2
(45) Date of Patent: Feb. 3, 2015

(54) AIR BAG CHUTE TOPPER SYSTEM

(75) Inventor: Nicholas Andrew Mazzocchi, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 13/172,970

(22) Filed: Jun. 30, 2011

(65) Prior Publication Data

US 2013/0001929 A1 Jan. 3, 2013

(51) Int. Cl.
  *B60R 21/215* (2011.01)
  *B60R 21/217* (2011.01)
  *B60R 21/16* (2006.01)

(52) U.S. Cl.
  CPC ....... *B60R 21/215* (2013.01); *B60R 2021/2172* (2013.01); *B60R 2021/161* (2013.01)
  USPC ...................... 280/728.3; 280/728.2; 280/732

(58) Field of Classification Search
  CPC .. B60R 21/205; B60R 21/217; B60R 21/215; B60R 2021/2172; B60R 2021/21518
  USPC ............................ 280/728.2, 728.3, 731, 732
  See application file for complete search history.

(56) References Cited

U.S. PATENT DOCUMENTS

| | | | | |
|---|---|---|---|---|
| 5,275,432 A | * | 1/1994 | Pray et al. | 280/728.2 |
| 5,388,858 A | * | 2/1995 | Cuevas | 280/728.2 |
| 5,439,246 A | * | 8/1995 | Ravenberg et al. | 280/728.3 |
| 5,460,400 A | * | 10/1995 | Davidson | 280/728.2 |
| 5,622,379 A | * | 4/1997 | Suzuki et al. | 280/728.2 |
| 5,639,116 A | * | 6/1997 | Shimizu et al. | 280/732 |
| 5,698,283 A | * | 12/1997 | Yamasaki et al. | 428/43 |
| 5,741,024 A | * | 4/1998 | Enders | 280/728.3 |
| 5,741,025 A | * | 4/1998 | Meyer et al. | 280/731 |
| 6,076,851 A | * | 6/2000 | Davis et al. | 280/728.2 |
| 6,089,642 A | * | 7/2000 | Davis et al. | 296/70 |
| 6,126,191 A | * | 10/2000 | Pepperine et al. | 280/728.2 |
| 6,273,455 B1 | * | 8/2001 | Bohn | 280/728.2 |
| 6,325,407 B1 | | 12/2001 | Soderquist | |
| 6,409,208 B1 | * | 6/2002 | Frisch et al. | 280/728.2 |
| 6,581,959 B2 | * | 6/2003 | Muller | 280/728.3 |
| 6,835,439 B1 | * | 12/2004 | Kondo et al. | 428/156 |
| 6,902,185 B2 | * | 6/2005 | North | 280/728.3 |
| 6,921,105 B2 | | 7/2005 | Speelman et al. | |
| 6,932,378 B2 | | 8/2005 | Thomas | |
| 6,942,240 B2 | * | 9/2005 | Kornylo et al. | 280/728.2 |
| 7,007,970 B2 | * | 3/2006 | Yasuda et al. | 280/728.3 |
| 7,052,036 B2 | * | 5/2006 | Lee et al. | 280/728.3 |
| 7,178,825 B2 | | 2/2007 | Fujii et al. | |
| 7,293,794 B2 | | 11/2007 | Clarke et al. | |
| 7,784,820 B2 | | 8/2010 | Mazzocchi et al. | |
| 7,891,702 B2 | * | 2/2011 | Evans et al. | 280/732 |
| 8,641,084 B2 | * | 2/2014 | Schupbach et al. | 280/728.3 |

(Continued)

OTHER PUBLICATIONS

"Airbag Cushion Flexible Cover for Improving Initial Deployment Trajectory," IPCOM000152710D, www.ip.com, Abstract, 2 pages, May 10, 2007.

*Primary Examiner* — James English

(74) *Attorney, Agent, or Firm* — Vichit Chea; Price Heneveld LLP

(57) ABSTRACT

An automobile air bag module is provided that includes a housing chute at least partially surrounding an air bag, wherein the housing chute comprises a front wall, a rear wall, at least one sidewall, and a female pocket located adjacent a housing chute sidewall. Also included is a topper cover having a reinforcement protrusion that comprises a male locking tab that matably engages the female pocket.

19 Claims, 3 Drawing Sheets

(56) References Cited

U.S. PATENT DOCUMENTS

| | | |
|---|---|---|
| 2002/0079676 A1* | 6/2002 | Ueno et al. ................. 280/728.2 |
| 2003/0205890 A1* | 11/2003 | Davis et al. .................. 280/732 |
| 2003/0230873 A1* | 12/2003 | Bayer ........................ 280/728.2 |
| 2006/0022438 A1* | 2/2006 | Beckley et al. ............ 280/728.3 |
| 2006/0131844 A1* | 6/2006 | Trevino et al. ............. 280/728.3 |
| 2006/0255569 A1* | 11/2006 | Weissert et al. ............ 280/728.3 |
| 2006/0290109 A1* | 12/2006 | Kielinen .................... 280/728.2 |
| 2007/0040360 A1* | 2/2007 | Riha et al. .................. 280/728.3 |
| 2008/0018081 A1* | 1/2008 | Yang et al. ................. 280/728.2 |
| 2008/0136145 A1 | 6/2008 | Kong |
| 2013/0076010 A1* | 3/2013 | Yoshimura et al. ........ 280/728.2 |

\* cited by examiner

AIR BAG CHUTE TOPPER SYSTEM

FIELD OF THE INVENTION

The present invention relates to vehicle air bag module assemblies.

BACKGROUND OF THE PRESENT INVENTION

During passenger air bag deployment, the passenger air bag deploys into the rearward wall of an air bag chute. This often creates separation of the chute to a topper by destroying the attachment joint between the chute and the topper. The separation allows the air bag cushion to fill in this area rather than in a more direct path to the occupant. Structural support of the passenger air bag module and reinforcement against excessive bell mouthing during the crash/deployment event would facilitate deployment of an air bag in a more efficient manner.

Accordingly, an apparatus is desired having the aforementioned advantages and solving and/or making improvements on the aforementioned disadvantages.

SUMMARY OF THE PRESENT INVENTION

In one aspect of the present invention, an automobile air bag module is provided that includes a housing chute at least partially surrounding an air bag, wherein the housing chute comprises a front wall, a rear wall, at least one sidewall, and a female pocket located adjacent a housing chute sidewall. Also included is a topper cover having a reinforcement protrusion that comprises a male locking tab that matably engages the female pocket.

In another aspect of the present invention, a locking arrangement for an automobile air bag is provided that includes a locking tab having an integral connection with a cover member, wherein the locking tab extends substantially perpendicularly away from a longitudinal axis of the cover member. Also included is a female recess having an integral connection with a housing chute, wherein the female recess matably receives the locking tab.

In another aspect of the present invention, a method of making an automobile air bag module is provided. The method includes providing a housing chute at least partially surrounding an air bag, wherein the housing chute comprises a front wall, a rear wall, at least one sidewall. Also provided is a female pocket located adjacent a housing chute sidewall, and a topper cover having a reinforcement protrusion that comprises a male locking tab that matably engages the female pocket. The method also includes the step of jointing the topper cover to the housing chute.

These and other aspects, objects, and features of the present invention will be understood and appreciated by those skilled in the art upon studying the following specification, claims, and appended drawings.

DETAILED DESCRIPTION OF EMBODIMENTS

For purposes of description herein, the terms "upper," "lower," "right," "left," "rear," "front," "vertical," "horizontal" and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
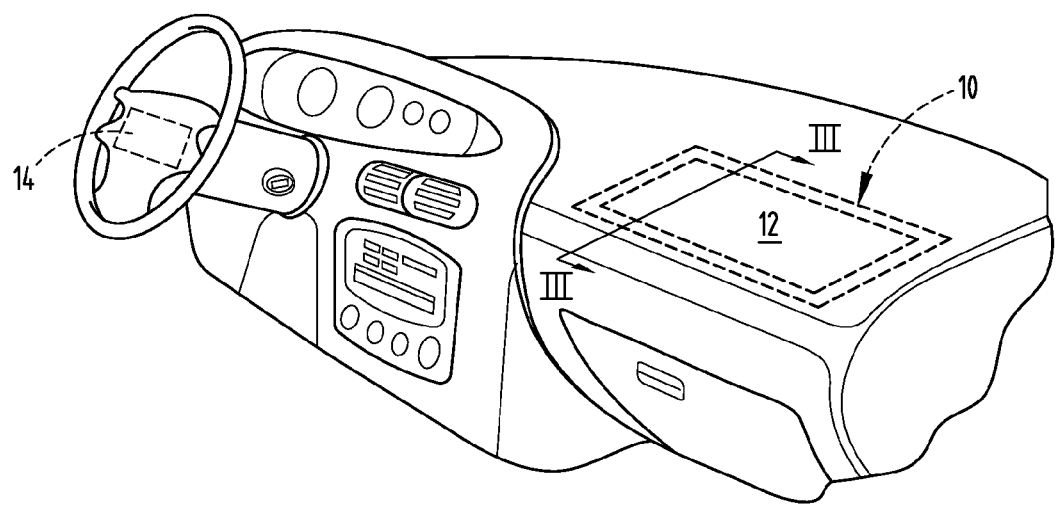
FIG. 1 is a perspective view of an interior compartment of an automobile having an air bag module.

Referring to FIG. 1, an interior of an automobile is illustrated having an air bag module 10 located proximate an instrument panel substrate 12. In the illustrated embodiment, the air bag module 10 is configured in a "top mount" position that being an upper surface of a dashboard or instrument panel 12. The air bag module 10 could be configured in a "front mount" position, that being a location proximate a glove box. Additionally, the air bag module is suitable for use in a steering wheel air bag module 14.

Figure 2:
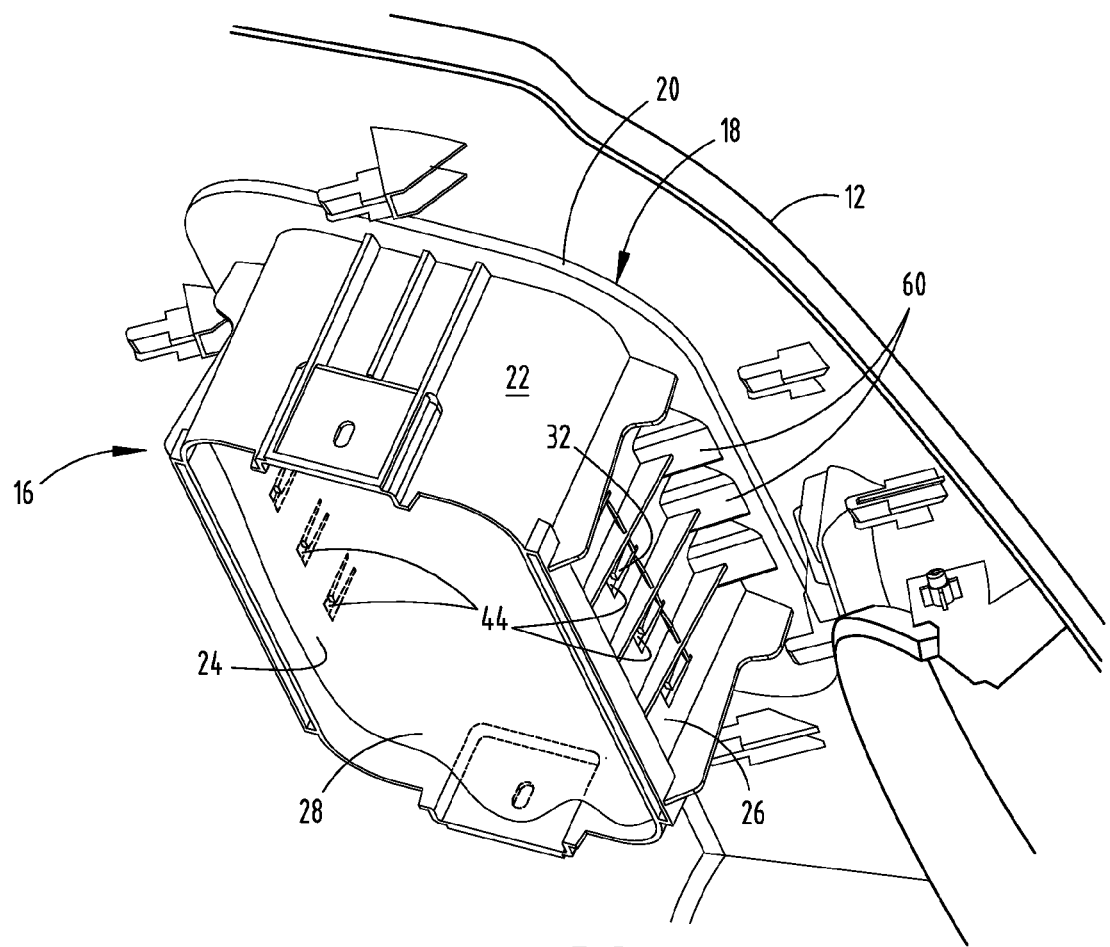
FIG. 2 is a perspective view of the air bag module.
Figure 3:
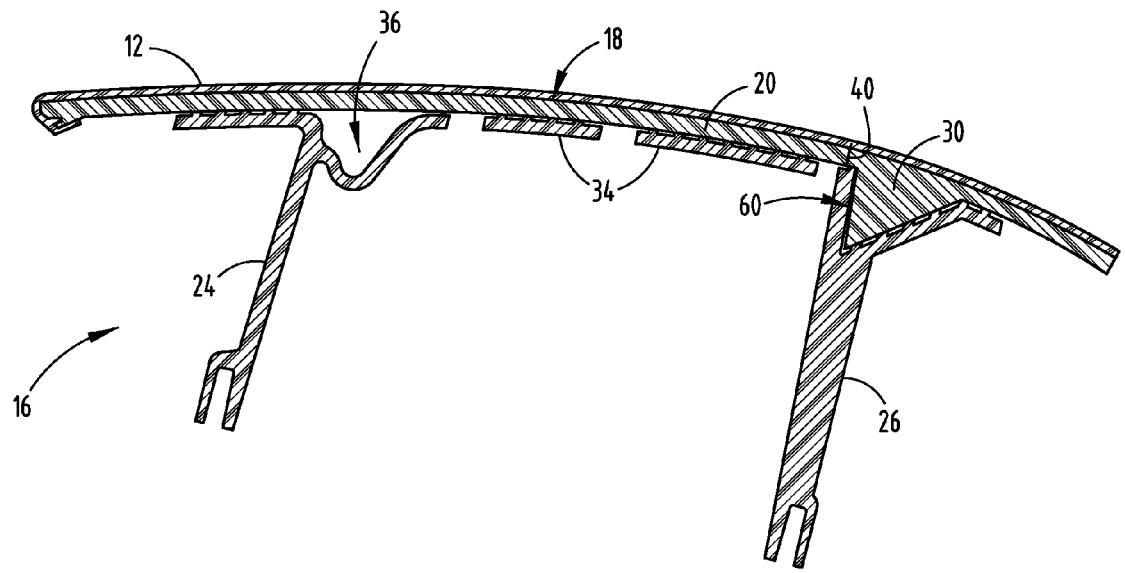
FIG. 3 is an elevated, side, cross-sectional view taken along line III-III of FIG. 1, illustrating the air bag module.

Referring to FIGS. 2 and 3, the air bag module 10 comprises a housing chute 16 for at least partially enclosing or surrounding an air bag (not illustrated), as well as a topper 18 that covers the housing chute 16. The housing chute 16 includes a top wall 34 that is positioned directly beneath the topper 18. Specifically, the topper 18 comprises a base section 20 that is positioned atop the top wall 34 of the housing chute 16. The shape of the topper base 20 and the top wall 34 of the housing chute 16 substantially corresponds to the shape of the instrument panel substrate 12. Although the instrument panel substrate 12 may take on a slightly curved configuration, for purposes of this discussion, it will be referred to as a generally planar configuration. As such, the top wall 34 of the housing chute 16 and the topper base 20 are considered to be generally coplanar with one another, as well as the instrument panel substrate 12.

The air bag chute 16 also includes a plurality of walls described as a front wall 24, a rear wall 26, and two sidewalls 22, 28 which extend downwardly from the top wall 34. The front and rear walls 24, 26 each contain several window apertures 44 for engagement with a corresponding number of attachment hooks extending from an air bag container (not illustrated). The window apertures 44 have pressure tabs 32 that bear against the inserted hooks to tighten the engagement connections and prevent rattling from occurring between the air bag container and the air bag chute 16 during vehicle operation, prior to air bag deployment.

The top wall 34 of the house chute 16 may include several apertures. Such apertures are positioned to reduce the mass of the top wall 34 without affecting its support or attachment properties.

Figure 4:
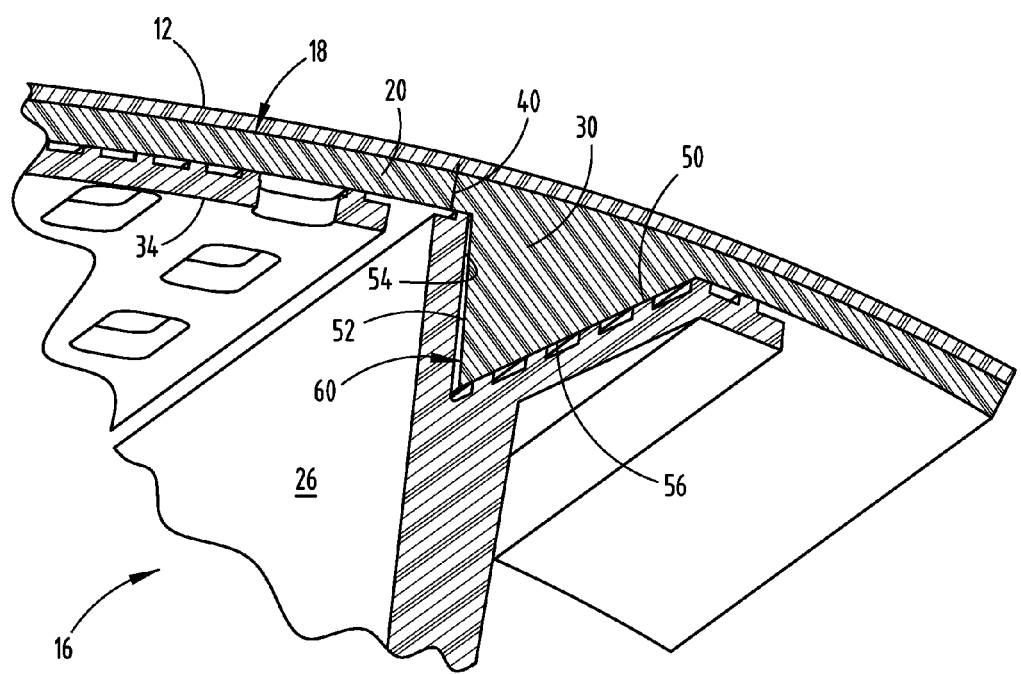
FIG. 4 is an elevated, side, cross-sectional view of a reinforcement protrusion of the air bag module.

Referring now to FIGS. 2 and 4, the air bag module 10 is structurally reinforced by one or more reinforcement protrusions 30 that extend away from the base 20 of the topper 18. The reinforcement protrusions 30 extend downwardly into female pockets 60 that are part of the housing chute 16 and are located proximate the rear wall 26 of the housing chute 16.

The reinforcement protrusions 30 may take on any number of geometric shapes, and in the illustrated embodiment, are wedge-like protrusions 30 that include a first edge 50 and a second edge 52. The female pocket 60 of the housing chute 16 is shaped to substantially correspond to the protrusion 30, and in the illustrated embodiment includes a first edge 54 and a second edge 56 for receiving the reinforcement protrusion 30. Although it is conceivable that a single reinforcement protrusion 30 and female pocket 60 may be employed, typically the air bag module 10 will include a plurality of reinforcement protrusions 30 and female pockets 60 that are spaced longitudinally along the rear wall 26 of the housing chute 16.

Any number of fastening methods may be employed to secure the topper 18 to the housing chute 16, and more specifically the reinforcement protrusions 30 within the female pockets 60. For example, the topper 18 may be welded to the housing chute 16, adhered by an adhesive to the housing chute 16, or snap fitted to the housing chute 16. These fastening techniques are merely illustrative and one skilled in the art may substitute various other methods of attachment. It is also conceivable that only the portion of the topper 18 containing the reinforcement protrusions 30 are secured to the female pockets 60, or alternatively may be fastened in a way that differs from the fastening of the base 20 of the topper 18 to the housing chute 16. Typically, the topper 18 that comprises a base 20 and reinforcement protrusions 30 will be an integrally molded piece or a single extruded piece. Similarly, typically the housing chute 16 and the female pocket 60 are integrally molded or are a single extruded piece.

The topper cover 18 includes a tear seam 40 that is positioned proximate the rear wall 26 of the housing chute 16 and proximate the second edge 52 of the reinforcement protrusion 30. The tear seam 40 is pre-weakened to the extent that the instrument panel substrate 12 and a portion of the topper 18 will rupture upon deployment of the air bag.

Figure 5:
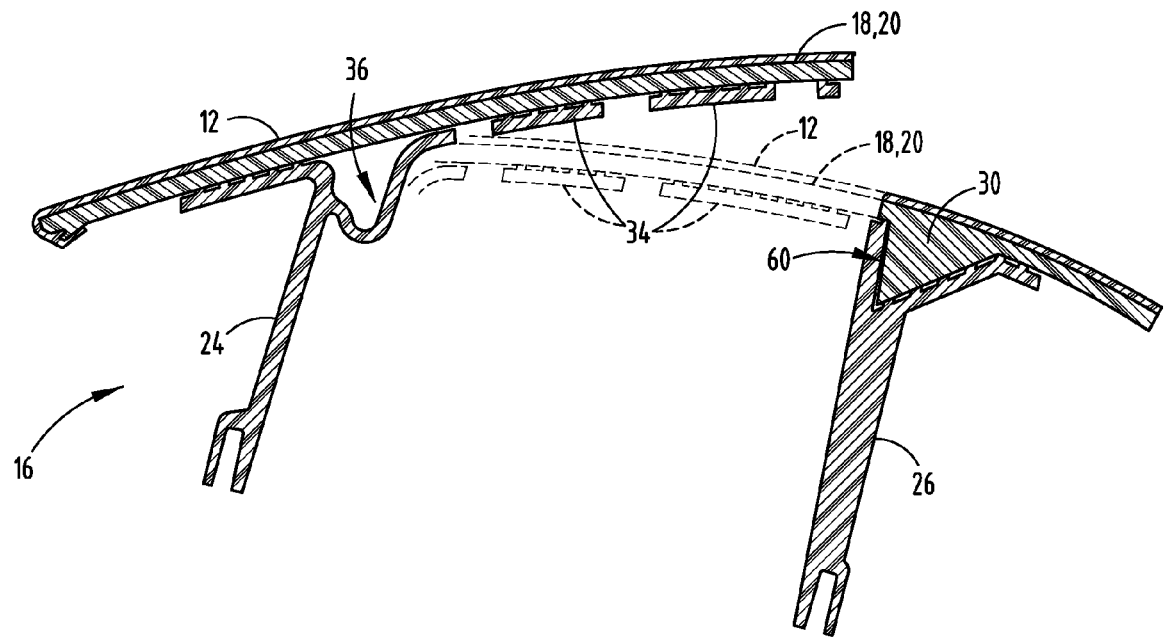
FIG. 5 is an elevated, side, cross-sectional view of the air bag module in a deployed position.
Figure 6:
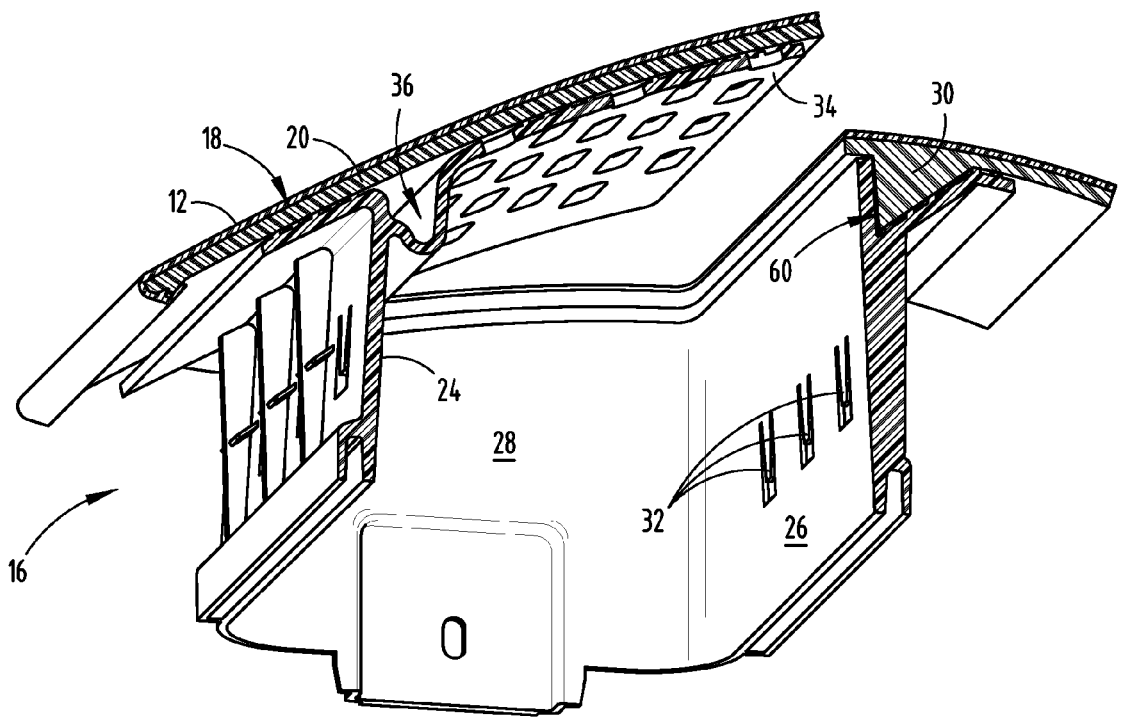
FIG. 6 is a perspective, cross-sectional view of the air bag module in the deployed position.

Referring to FIGS. 5 and 6, deployment of an air bag is illustrated, although the actual air bag is not shown for purposes of clarity. A hinge 36 extends substantially between the front wall 24 and the top wall 34 upon deployment of the air bag. During deployment, the tear seam 40 ruptures, as described above, such that the instrument panel substrate 12, the base 20 of the topper 18, as well as the top wall 34 of the housing chute 16, pivots upwardly to allow the air bag to release towards a passenger. As the force of the air bag projects upwardly and rearwardly towards, at least in part, the rear wall 26 of the housing chute 16, the reinforcement protrusion 30 that is secured to the female pocket 60 provides structural integrity by preventing deflection or bell mouthing of critical air bag module 10 components, such as the rear wall 26.

The inventive concept also provides a method of making the air bag module 10. The method includes providing the structure described in detail above, as well as securely jointing the topper cover 18 to the housing chute 16, and more specifically the reinforcement protrusions 30 within the female pockets 60. Any number of jointing techniques may be employed, as outlined above, for example welding, adhering, and snap fitting.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An automobile air bag module comprising:
    a housing chute having a front wall, a rear wall, and at least one sidewall together at least partially surrounding an air bag of an air bag container, wherein an upper portion of the rear wall includes a plurality of female pockets spaced along a top edge of the rear wall and each having a first wall portion in alignment with the upper portion of the rear wall and a second wall portion protruding rearward therefrom to define a wedge-shaped cavity; and
    a topper cover having a top wall pivotally coupled with the front wall and spanning over the housing chute to cover the air bag and a base section positioned atop the top wall and spanning beyond the top wall integrally with a surrounding trim substrate, wherein the base section of the topper cover includes a bottom surface that abuts the front wall, rear wall, and at least one sidewall, and wherein the base section includes a plurality of reinforcement protrusions that extend downward from the bottom surface in a wedge shape with a thickness that consistently reduces from the bottom surface to a nadir of each wedge-shaped cavity and matably engage a first surface and a second surface of the respective first and second wall portions of the plurality of female pockets, thereby encapsulating the plurality of reinforcement protrusions in the plurality of female pockets, such that rearward deflection of the rear wall is restricted by the plurality of reinforcement protrusions upon deployment of the air bag.

2. The automobile air bag module of claim 1, wherein the topper cover is welded to the housing chute.

3. The automobile air bag module of claim 1, wherein the topper cover is adhered by an adhesive to the housing chute.

4. The automobile air bag module of claim 1, wherein the wedge shape of the plurality of reinforcement protrusions includes a first planar edge and a second planar edge extending to meet at a point proximate the nadir.

5. The automobile air bag module of claim 1, wherein the topper cover and the reinforcement protrusion are integrally molded.

6. The automobile air bag module of claim 1, wherein the topper cover includes a tear seam forward from the plurality of reinforcement protrusions that extends along the rear wall.

7. The automobile air bag module of claim 1, wherein the housing chute and the plurality of female pockets are integrally molded.

8. The automobile air bag module of claim 1, wherein the housing chute and the plurality of female pockets are a single extruded piece.

9. A method of making an automobile air bag module, comprising:
    providing a housing chute having a front wall, a rear wall, and at least one sidewall that together border an air bag of an air bag container, wherein a plurality of female pockets are formed longitudinally along a top edge of the rear wall, each having a first wall portion in alignment with the upper portion of the rear wall and a second wall portion protruding rearward therefrom to define a wedge-shaped cavity;
    providing a topper cover having a top wall pivotally coupled with the front wall and spanning over the housing chute and a base section positioned atop the top wall and spanning beyond the top wall integrally with a surrounding trim substrate, wherein a plurality of reinforcement protrusions extend downward from the base section in a wedge shape with a thickness that consistently reduces from a bottom surface of the base section; and jointing the plurality of reinforcement protrusions into the plurality of female pockets, wherein in a first edge and a second edge of the wedge shape engage a first surface and a second surface of the respective first and second wall portions of the plurality of female pockets, thereby encapsulating the plurality of reinforcement protrusions in the plurality of female pockets to provide a secured connection that reinforces the rear wall to prevent rearward deflection upon deployment of the air bag.

10. The method of making the automobile air bag module of claim 9, wherein the step of jointing the topper cover to the housing chute includes welding the topper cover to the housing chute.

11. The method of making the automobile air bag module of claim 9, wherein the step of jointing the topper cover to the housing chute includes employing an adhesive to adhere the topper cover to the housing chute.

12. The method of making the automobile air bag module of claim 9, wherein the step of jointing the topper cover to the housing chute includes adhering the first edge and the second edge of the plurality of reinforcement protrusions into the female pockets.

13. A locking arrangement between a topper cover and a housing chute for restricting rearward deflection of the housing chute upon deployment of an air bag, comprising:
    reinforcement protrusions that each extend downward from a base section of the topper cover in a wedge shape with a thickness that consistently reduces from a bottom surface of the base section, wherein the base section spans beyond a rear wall of the housing chute integrally with a surrounding trim substrate; and
    female recesses spaced longitudinally along a top edge of the rear wall and extending downward to each define a wedge-shaped cavity that matably receives one of the reinforcement protrusions, wherein each wedge-shaped cavity has a first wall portion in alignment with the rear wall to engage a first edge of the wedge shape and a second wall portion protruding rearward therefrom to engage a second edge of the wedge shape, thereby encapsulating the plurality of reinforcement protrusions in the plurality of female pockets for reinforcing an upper portion of the rear wall to prevent rearward deflection.

14. The locking arrangement of claim 13, wherein the reinforcement protrusions each have a height greater than a thickness of the topper cover.

15. The locking arrangement of claim 13, wherein the topper cover is adhered by an adhesive to the housing chute.

16. The locking arrangement of claim 13, wherein the first and second edges of the wedge shape of each reinforcement protrusion both include a planar surface and extend downward to meet at a point proximate a nadir of the wedge-shaped cavity.

17. The locking arrangement of claim 13, wherein the topper cover and the reinforcement protrusions are integrally molded.

18. The locking arrangement of claim 13, wherein the reinforcement protrusions extend downward from the topper cover outside a weakened portion of the topper cover that is configured to rupture upon deployment of the air bag.

19. The locking arrangement of claim 13, wherein the female recesses and the housing chute are integrally molded.

* * * * *